United States Patent [19]
Benveniste

[11] Patent Number: 5,740,536
[45] Date of Patent: Apr. 14, 1998

[54] SYSTEM AND METHOD FOR MANAGING NEIGHBOR-CHANNEL INTERFERENCE IN CHANNELIZED CELLULAR SYSTEMS

[75] Inventor: Mathilde Benveniste, South Orange, N.J.

[73] Assignee: AT&T Corp., Middletown, N.J.

[21] Appl. No.: 580,570

[22] Filed: Dec. 29, 1995

[51] Int. Cl.$^6$ ........................................ H04Q 7/20
[52] U.S. Cl. ........................ 455/447; 455/63; 455/450
[58] Field of Search .......................... 455/33.1, 32.2, 455/56.1, 54.1, 63, 296, 450, 446, 452, 451, 449, 447, 62

[56] References Cited

U.S. PATENT DOCUMENTS

| | | | |
|---|---|---|---|
| 5,257,398 | 10/1993 | Schaeffer | 455/33.1 |
| 5,404,574 | 4/1995 | Benveniste | 455/33.1 |
| 5,483,667 | 1/1996 | Faruque | 455/33.1 |
| 5,507,034 | 4/1996 | Bodin et al. | 455/34.1 |
| 5,613,198 | 3/1997 | Ahmadi et al. | 455/33.1 |

*Primary Examiner*—Nguyen Vo
*Assistant Examiner*—Darnell R. Armstrong
*Attorney, Agent, or Firm*—Alfred G. Steinmetz

[57] ABSTRACT

Novel methodologies are provided for managing neighbor channel interference in a cellular wireless communications system as a function of a service-quality factor for a communications channel within such a system. Those methodologies, and their essential function are characterized as:

Even/Odd Cell Designation—for eliminating adjacent-channel conflicts within a cell;

Vertical Channel-Set Construction—for eliminating adjacent-channel conflicts between abutting sectors in sectorized cells; and Minimum Adjacency Circuit Method—for reducing the number of adjacent edges between abutting cells or sectors in a regular channel assignment.

4 Claims, 10 Drawing Sheets

FIG. 7

CHANNEL SETS

| α | | | | | | | β | | | | | | | γ | | | | | | |
|---|---|---|---|---|---|---|---|---|---|---|---|---|---|---|---|---|---|---|---|---|
| 1 | 2 | 3 | 4 | 5 | 6 | 7 | 1 | 2 | 3 | 4 | 5 | 6 | 7 | 1 | 2 | 3 | 4 | 5 | 6 | 7 |
| 1 | 2 | 3 | 4 | 5 | 6 | 7 | 8 | 9 | 10 | 11 | 12 | 13 | 14 | 15 | 16 | 17 | 18 | 19 | 20 | 21 |
| 22 | 23 | 24 | 25 | 26 | 27 | 28 | 29 | 30 | 31 | 32 | 33 | 34 | 35 | 36 | 37 | 38 | 39 | 40 | 41 | 42 |
| 43 | 44 | 45 | 46 | 47 | 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 | 97 | 98 | 99 | 100 | 101 | 102 | 103 | 104 | 105 |
| 106 | 107 | 108 | 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 | 145 | 146 | 147 |
| 148 | 149 | 150 | 151 | 152 | 153 | 154 | 155 | 156 | 157 | 158 | 159 | 160 | 161 | 162 | 163 | 164 | 165 | 166 | 167 | 168 |
| 169 | 170 | 171 | 172 | 173 | 174 | 175 | 176 | 177 | 178 | 179 | 180 | 181 | 182 | 183 | 184 | 185 | 186 | 187 | 188 | 189 |
| 190 | 191 | 192 | 193 | 194 | 195 | 196 | 197 | 198 | 199 | 200 | 201 | 202 | 203 | 204 | 205 | 206 | 207 | 208 | 209 | 210 |
| 211 | 212 | 213 | 214 | 215 | 216 | 217 | 218 | 219 | 220 | 221 | 222 | 223 | 224 | 225 | 226 | 227 | 228 | 229 | 230 | 231 |
| 232 | 233 | 234 | 235 | 236 | 237 | 238 | 239 | 240 | 241 | 242 | 243 | 244 | 245 | 246 | 247 | 248 | 249 | 250 | 251 | 252 |
| 253 | 254 | 255 | 256 | 257 | 258 | 259 | 260 | 261 | 262 | 263 | 264 | 265 | 266 | 267 | 268 | 269 | 270 | 271 | 272 | 273 |
| 274 | 275 | 276 | 277 | 278 | 279 | 280 | 281 | 282 | 283 | 284 | 285 | 286 | 287 | 288 | 289 | 290 | 291 | 292 | 293 | 294 |
| 295 | 296 | 297 | 298 | 299 | 300 | 301 | 302 | 303 | 304 | 305 | 306 | 307 | 308 | 309 | 310 | 311 | 312 | 313 | 314 | 315 |
| 316 | 317 | 318 | 319 | 320 | 321 | 322 | 323 | 324 | 325 | 326 | 327 | 328 | 329 | 330 | 331 | 332 | 333 | 334 | 335 | 336 |
| 337 | 338 | 339 | 340 | 341 | 342 | 343 | 344 | 345 | 346 | 347 | 348 | 349 | 350 | 351 | 352 | 353 | 354 | 355 | 356 | 357 |
| 358 | 359 | 360 | 361 | 362 | 363 | 364 | 365 | 366 | 367 | 368 | 369 | 370 | 371 | 372 | 373 | 374 | 375 | 376 | 377 | 378 |
| 379 | 380 | 381 | 382 | 383 | 384 | 385 | 386 | 387 | 388 | 389 | 390 | 391 | 392 | 393 | 394 | 395 | 396 | 397 | 398 | 399 |

FIG. 8

| ANTENNA ORIENTATION | CHANNEL SETS | | | | | | |
|---|---|---|---|---|---|---|---|
| | 1 | 2 | 3 | 4 | 5 | 6 | 7 |
| α | 1 | 2 | 3 | 4 | 5 | 6 | 7 |
| | 8 | 9 | 10 | 11 | 12 | 13 | 14 |
| | 15 | 16 | 17 | 18 | 19 | 20 | 21 |
| | 22 | 23 | 24 | 25 | 26 | 27 | 28 |
| | 29 | 30 | 31 | 32 | 33 | 34 | 35 |
| | 36 | 37 | 38 | 39 | 40 | 41 | 42 |
| | 43 | 44 | 45 | 46 | 47 | 48 | 49 |
| | 50 | 51 | 52 | 53 | 54 | 55 | 56 |
| | 57 | 58 | 59 | 60 | 61 | 62 | 63 |
| | 64 | 65 | 66 | 67 | 68 | 69 | 70 |
| | 71 | 72 | 73 | 74 | 75 | 76 | 77 |
| | 78 | 79 | 80 | 81 | 82 | 83 | 84 |
| | 85 | 86 | 87 | 88 | 89 | 90 | 91 |
| | 92 | 93 | 94 | 95 | 96 | 97 | 98 |
| | 99 | 100 | 101 | 102 | 103 | 104 | 105 |
| | 106 | 107 | 108 | 109 | 110 | 111 | 112 |
| | 113 | 114 | 115 | 116 | 117 | 118 | 119 |
| | 120 | 121 | 122 | 123 | 124 | 125 | 126 |
| | 127 | 128 | 129 | 130 | 131 | 132 | 133 |
| β | 134 | 135 | 136 | 137 | 138 | 139 | 140 |
| | 141 | 142 | 143 | 144 | 145 | 146 | 147 |
| | 148 | 149 | 150 | 151 | 152 | 153 | 154 |
| | 155 | 156 | 157 | 158 | 159 | 160 | 161 |
| | 162 | 163 | 164 | 165 | 166 | 167 | 168 |
| | 169 | 170 | 171 | 172 | 173 | 174 | 175 |
| | 176 | 177 | 178 | 179 | 180 | 181 | 182 |
| | 183 | 184 | 185 | 186 | 187 | 188 | 189 |
| | 190 | 191 | 192 | 193 | 194 | 195 | 196 |
| | 197 | 198 | 199 | 200 | 201 | 202 | 203 |
| | 204 | 205 | 206 | 207 | 208 | 209 | 210 |
| | 211 | 212 | 213 | 214 | 215 | 216 | 217 |
| | 218 | 219 | 220 | 221 | 222 | 223 | 224 |
| | 225 | 226 | 227 | 228 | 229 | 230 | 231 |
| | 232 | 233 | 234 | 235 | 236 | 237 | 238 |
| | 239 | 240 | 241 | 242 | 243 | 244 | 245 |
| | 246 | 247 | 248 | 249 | 250 | 251 | 252 |
| | 253 | 254 | 255 | 256 | 257 | 258 | 259 |
| | 260 | 261 | 262 | 263 | 264 | 265 | 266 |
| γ | 267 | 268 | 269 | 270 | 271 | 272 | 273 |
| | 274 | 275 | 276 | 277 | 278 | 279 | 280 |
| | 281 | 282 | 283 | 284 | 285 | 286 | 287 |
| | 288 | 289 | 290 | 291 | 292 | 293 | 294 |
| | 295 | 296 | 297 | 298 | 299 | 300 | 301 |
| | 302 | 303 | 304 | 305 | 306 | 307 | 308 |
| | 309 | 310 | 311 | 312 | 313 | 314 | 315 |
| | 316 | 317 | 318 | 319 | 320 | 321 | 322 |
| | 323 | 324 | 325 | 326 | 327 | 328 | 329 |
| | 330 | 331 | 332 | 333 | 334 | 335 | 336 |
| | 337 | 338 | 339 | 340 | 341 | 342 | 343 |
| | 344 | 345 | 346 | 347 | 348 | 349 | 350 |
| | 351 | 352 | 353 | 354 | 355 | 356 | 357 |
| | 358 | 359 | 360 | 361 | 362 | 363 | 364 |
| | 365 | 366 | 367 | 368 | 369 | 370 | 371 |
| | 372 | 373 | 374 | 375 | 376 | 377 | 378 |
| | 379 | 380 | 381 | 382 | 383 | 384 | 385 |
| | 386 | 387 | 388 | 389 | 390 | 391 | 392 |
| | 393 | 394 | 395 | 396 | 397 | 398 | 399 |

— N = CLUSTER BORDER
═ NEIGHBOR CELLS WITH ADJACENT CHANNELS

FIG. 11a    N=8

SYSTEM AND METHOD FOR MANAGING NEIGHBOR-CHANNEL INTERFERENCE IN CHANNELIZED CELLULAR SYSTEMS

CROSS REFERENCE TO RELATED APPLICATIONS

This application is related to U.S. patent application Ser. No. 08/580,568 filed Dec. 29, 1995 entitled "System and Method For Management of Neighbor Channel Interference With Cellular Reuse Partitioning", (M. BENVENISTE-8), and U.S. patent application Ser. No. 08/581,694, filed Dec. 29, 1995, entitled "System and Method For Management of Neighbor Channel Interference With Power Control and Directed Channel Assignment", (M. BENVENISTE-9), said related applications being concurrently filed with the present application, having the same inventor, and being incorporated herein by reference.

BACKGROUND OF THE INVENTION

A. Field of the Invention

This application is related to wireless communications systems and more particularly to improved means for managing neighbor-channel interference in channelized cellular systems.

B. Background Art

In the art of wireless communications, considerations of spectral efficiency and maximization of available channels generally dictate the use of a cellular arrangement of such channels and the frequencies from which they are derived— i.e., a service area is partitioned into connected service domains known as cells. Within a particular cell, users communicate via radio links with a base station serving that cell, that base station being connected to base stations for other cells comprising a wireless communications network. That wireless communications network will, in turn, ordinarily be connected with one or more wired networks. To communicate using such a wireless network, each user is assigned one of a discrete set of channels.

A conventional regular hexagonal cell layout of a wireless cellular communications system is shown in schematic form in FIG. 1.[1]/As is known, depicting the geographical service area in terms of a hexagonal grid establishes a geometric pattern that permits frequencies to be assigned in a patterned disposition allowing the reuse of those frequencies in a controlled repeatable regular assignment model. The cell areas each have specific channel sets assigned to them. [2]/Each channel set comprises a plurality of individual transmit and receive radio channels for use within the cell area. In the model shown in FIG. 1, cells marked "A" are co-user cells and all use the same channel set. The same is true for co-user cells marked "B", "C" etc., each of which has its own assigned channel set.

[1]/It should be understood that the hexagonal shape of the cells depicted in FIG. 1 represents a drawing convention. Such a hexagonal cell representation has been chosen because it approaches a circular shape that is the ideal power coverage area for a cell. However, use of such circular shapes would involve overlapped areas and make a drawing of the served area unclear. With the hexagonal shaped cell convention, on the other hand, the plurality of cells representing a service area can be depicted with no gap and no overlap between cells.

[2]/Of course, as discussed more fully below, flexible channel assignment methodologies, which represent a relatively recent development in the wireless communications art, will generally involve non-fixed channel assignments within a cell.

Each cell is radiated by an antenna system associated with a base station, which base stations may be interconnected with each other and/or with other networks. An omnidirectional radiation pattern is depicted by antenna 101 and a directional antenna pattern, representing sectorization of cells into smaller wedge type service areas, is represented by antenna 102.

It is well known that a central aspect of cellular communications systems is the concept of frequency reuse. With frequency reuse, users in different geographical locations (different cells) may simultaneously use the same frequency channel, as depicted by commonly named cells in FIG. 1 for regular channel assignment. While frequency reuse can substantially increase spectral efficiency of a system, serious interference can occur between cells involved in the common use of the same channel in the absence of proper system design.

Frequency reuse assignments are generally implemented through the adoption of simple rules for identifying co-user cells and for partitioning the RF spectrum into channel sets. Channel assignment approaches can be broadly classified into two categories: fixed and flexible [See, M. Benveniste, "Self Configurable Wireless Systems", forthcoming]. Fixed channel assignment fixes the relationship between cells and the channels serving them. Only the channels allocated to a cell can serve calls in that cell, and each channel can be used simultaneously by all the cells to which the channel is assigned. An example of fixed channel assignment is "regular" channel assignment, which is characterized by equally-sized, regularly-spaced cells. Regular channel assignment is optimal for a system with traffic distributed uniformly across cells.

When the traffic distribution is not uniform, an optimal fixed "non-regular" channel allocation can be found, which allocates channels to cells according to their traffic load. [A process for achieving such an optimal non-regular allocation is described in M. Benveniste, "Apparatus and Method for Non-Regular Channel Assignment in Wireless Communication Networks", U.S. Pat. No. 5,404,574.]

Flexible channel assignment methods exploit the capability of a system for remote, software-driven, retuning of the base station radios, which capability enables channel capacity to adapt to traffic variation. The class of flexible channel assignment methodologies includes adaptive and dynamic channel assignment methods, and a hybrid of the two, adaptive-dynamic channel assignment [See, M. Benveniste, "Self Configurable Wireless Systems", id].

It is also well known that the quality of communication in wireless systems depends substantially on the ratio of the received signal to interference (S/I). The primary interference of concern consists of two components: co-channel interference and neighbor-channel interference. Co-channel interference is the interference from communication sources tuned to the same frequency as the operating channel. Neighbor-channel interference comes from communication sources using channels near the operating channel in the frequency spectrum. When the interfering neighbor channel is adjacent to the operating channel in the spectrum, the term adjacent-channel interference is generally used. To achieve the desired voice or data transmission quality, the ratio of the received signal over the combined co-channel and neighbor-channel interference must be above a specified threshold.

The need to avoid using neighbor channels within a cell and in neighbor cells has been well-recognized. In conventional channel assignment in analog AMPS systems, where three-sector cells re-use the spectrum in clusters of 7 cells, the spacing of 21 channels (630 kHz) between channels serving the same cell—as illustrated generally by the sectorized pattern of FIG. 2—has been more than adequate to render negligible any interference from neighbor channels. For physically contiguous cells, it is sufficient to avoid the assignment of adjacent channel sets to sectors of the same cell, or to sectors in such contiguous cells which would be contiguous to the sector under consideration. As can be seen in FIG. 2, such a channel assignment exists for the three-sector re-use group of size 7.

As less conventional channel assignment approaches, like flexible or non-regular fixed channel assignment, are pursued, however, such near automatic satisfaction of channel spacing requirements no longer occurs. There the cellular system designer faces the question: what is the minimum spectrum separation required between channels used simultaneously in a cell, or in neighboring cells. The approaches which have been proposed for answering this question do not consider neighbor-channel interference adequately, if at all.[2]/In particular, prior treatment of neighbor-channel interference, and the derivation of channel spacing requirements, has not considered the overall impact on the S/I ratio [See: W. C. Y. Lee, *Mobile Cellular Telecommunications Systems*, McGraw-Hill, New York, 1989]. Such failure to consider the impact of neighbor-channel interference on the S/I ratio will result in a signal that is weaker than the interference. By balancing the relative strength of an interfering signal located near the receiver with the signal strength drop caused by channel separation, the resulting S/I ratio would be equal to 1 (0 dB) in the absence of co-channel interference. If some co-channel interference were present, the resulting S/I ratio would be less than 1 (negative, when expressed in dB).

[2]/Examples of such prior approaches appear in the following references. N. Bambos and G. J. Pottie, "On power control in high capacity radio networks", *Third WINLAB Workshop*, pp. 239–247, 1992; R. Beck and H. Panzer, "Strategies for Handover and Dynamic Channel Allocation in Micro-Cellular Mobile Radio Systems", *Proc. IEEE Vehicular Technol. Conference*, May 1989; D. C. Cox and D. O. Reudink, "Dynamic Channel Assignment in Two-Dimensional Large-Scale Mobile Radio Systems", *Bell System Technical Journal*, Vol. 51, No. 7, pp. 1611–1629, September 1972; S. M. Elnoubi, R. Singh, and S. C. Gupta, "A new frequency channel assignment algorithm in high communication systems", *IEEE Trans. Veh. Technol.*, Vol. 31, No. 3, August 1982; G. J. Foschini and Z. Miljanic, "A simple distributed autonomous power control algorithm and its convergence", *IEEE Trans. Veh. Technol.*, November 1993; H. Jiang and S. S. Rappaport, "CBWL: A new channel assignment and sharing method for cellular communication systems", *IEEE Veh. Technol. Conference*, May 1993; T. J. Kahwa and N. D. Georganas, "A hybrid channel assignment scheme in large-scale, cellular-structured mobile communication systems", *IEEE Trans. Commun.*, Vol. 26, No. 4, April 1978; S. Nanda and D. J. Goodman, "Dynamic Resource Acquisition: Distributed Carrier Allocation for TDMA Cellular Systems", *Third Generation Wireless Information Networks*, S. Nanda and D. J. Goodman (eds), pp. 99–124, Kluwer Academic Publishers, Boston, 1992; R. J. Pennotti, *Channel Assignment in Cellular Mobile Communication Systems*, Ph.D. Dissertation, Polytechnic Institute of New York, 1976; J. Zander, "Transmitter power control for co-channel interference management in cellular systems", *Fourth WINLAB Workshop*, pp. 241–247, 1993.

Since the S/I requirement implies a restriction on total interference, and total interference is the sum of two terms (co-channel plus neighbor-channel interference), there is a trade-off between them. Neighbor-channel interference decreases when there is a larger frequency-spectrum separation between channels, thus leaving a greater margin for co-channel interference. A lesser re-use distance is thus allowed, and the system capacity is higher, at least in principle. A larger channel separation, however, makes fewer channels available in each cell, which would lead to a capacity decrease if everything else stayed the same. Thus an important objective of the system designer would be a determination of the optimal channel separation for which the S/I requirement is met, and spectrum utilization is maximum.

SUMMARY OF THE INVENTION

This invention provides novel methodologies for managing neighbor channel interference in a cellular wireless communications system as a function of a service-quality factor for a communications channel within such a system. The novel methodologies for managing neighbor-channel interference which are disclosed herein, each of which represents an embodiment of the invention, include:

Even/Odd Cell Designation—for eliminating adjacent-channel conflicts within a cell;

Vertical Channel-Set Construction—for eliminating adjacent-channel conflicts between abutting sectors in sectorized cells; and Minimum Adjacency Circuit Method—for reducing the number of adjacent edges between abutting cells or sectors in a regular channel assignment.

BRIEF DESCRIPTION OF THE DRAWINGS

FIG. 7 shows a channel set arrangement for sectorized cells using the horizontal channel set construction method.

FIG. 8 shows a channel set arrangement for sectorized cells using the vertical channel set construction method of the invention.

DETAILED DESCRIPTION

The discussion following will be presented partly in terms of algorithms and symbolic representations of operations on data within a computer system. As will be understood, these algorithmic descriptions and representations are a means ordinarily used by those skilled in the systems engineering arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

For clarity of explanation, an illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, some or all of the functions of the "OMC", "MSCs", and "BSs" presented in FIGS. 3 and 4, as well as the "Computer Processor" of FIG. 4, may be provided by one or more processors, including shared processors. (Use of the term "processor" should not be construed to refer exclusively to hardware capable of executing software.)

Illustrative embodiments may comprise microprocessor and/or digital signal processor (DSP) hardware, such as the AT&T DSP16 or DSP32C, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 3:
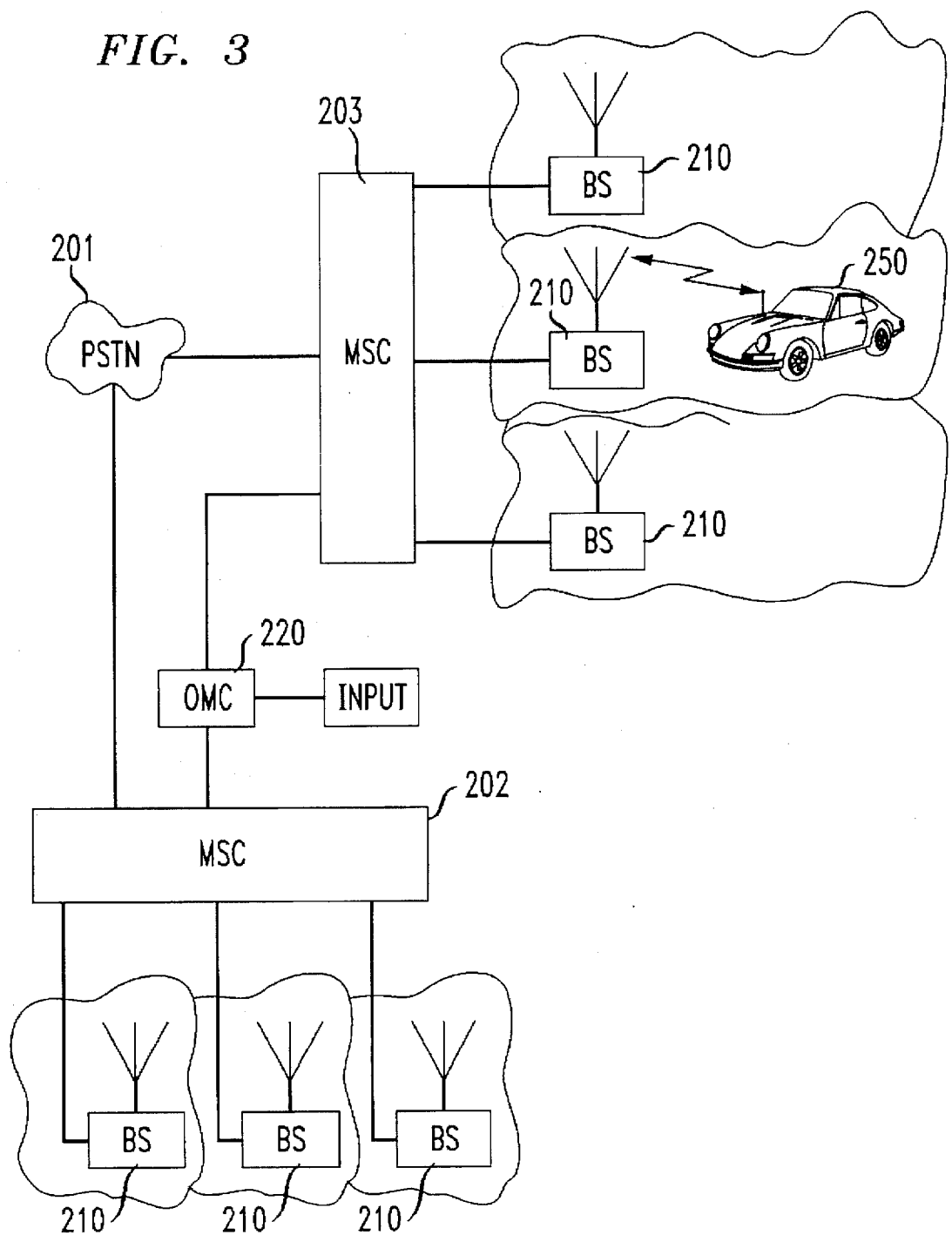
FIG. 3 shows in block diagram form the major elements of a wireless cellular communications system and the typical interconnections among such elements.

A typical cellular system is shown in the block diagram of FIG. 3. A plurality of mobile switching centers (MSC), 202 and 203, are shown connecting the mobile radiotelephone system to the public switched telephone network 201 (PSTN). The switching of the MSCs interconnects a plurality of base stations (BS) 210 each providing service to a cell coverage area. Each coverage area is shown as having irregular boundaries typical of an actual system. Each BS has radio transmit/receive equipment and radiating antennas to serve mobile radio telephoned 250 within its cell coverage area.

An operation and management center (OMC) 220 is coupled to the MSCs 202 and 203 to control their system operation and their associated BSs 210. OMC 220 is a central control station which includes data processing and input for accepting data input from data storage and real time control. In the case of flexible channel assignment, this data processing arrangement may be utilized in implementing channel arrangements in combination with remotely tunable radio transceivers located at the BSs.

Figure 4:
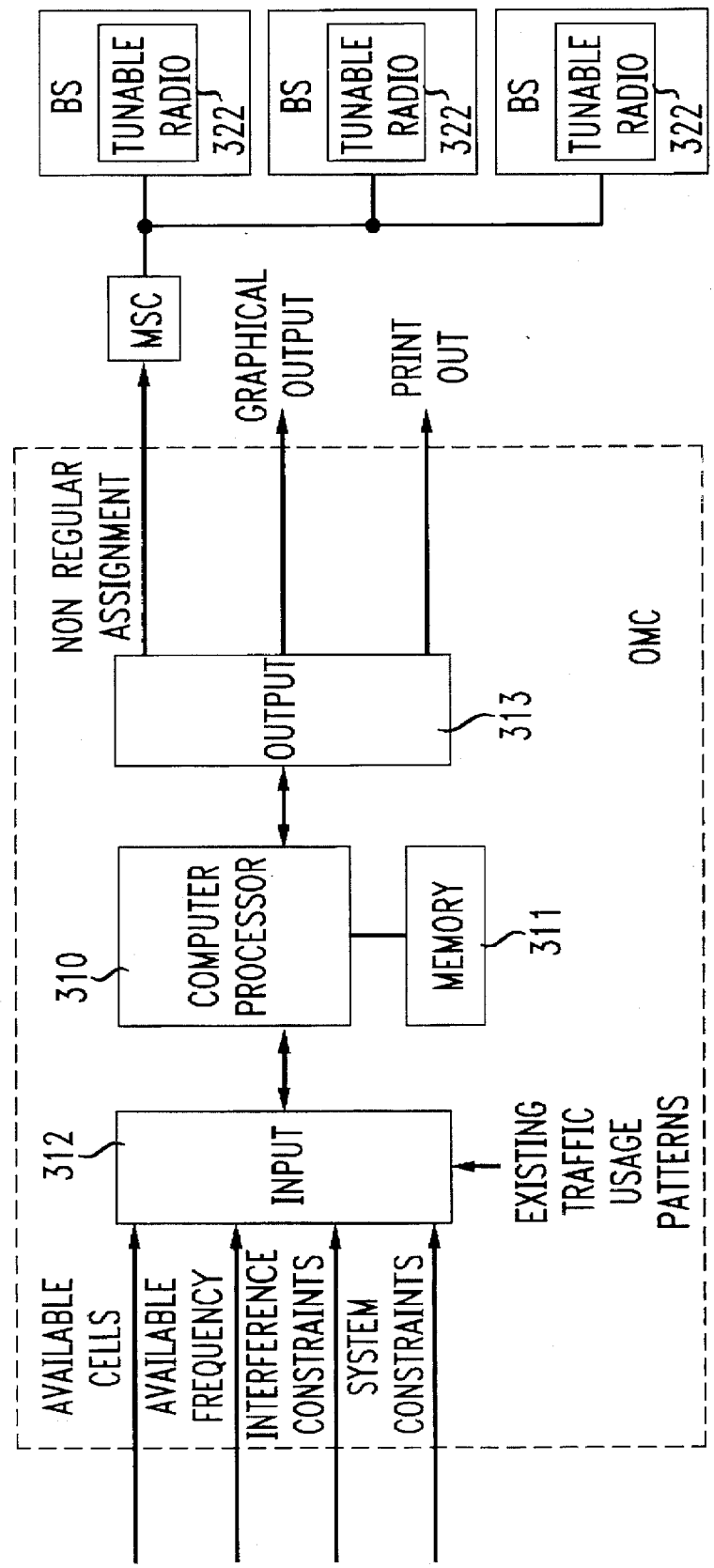
FIG. 4 shows a schematic block diagram of a data processing system for controlling the assignment of radio channels to various cells of a wireless cellular communications system using a flexible channel assignment methodology.

For such a flexible channel assignment case, an illustrative embodiment of data processing equipment included in the OMC for controlling the assignment and tuning of radio transceivers at the BSs is shown in schematic block diagram form in FIG. 4. A Computer Processor 310 has a stored program included in an associated Memory 311. This program may include instructions for performing the assignment of radio channels to a cellular system. Initial input data is supplied through the Input function 312 to the Computer Processor 310. Inputs include: the available cells, available radio frequencies, and interference information, usually in the form of a cell-to-cell interference matrix which defines the interference to each cell from every other cell. Further inputs include system constraints necessary for the desired channel assignment and traffic usage patterns.

To implement a flexible channel assignment methodology, the channel assignment process will be performed by Computer Processor 310 according to the instructions contained in Memory 311. The resulting channel assignments may be output via the Output function 313 to the MSC 315, from which they may be forwarded to the BSs 321. The individual tunable radios 322 included in the BSs may then be tuned to the proper frequencies in accord with the assignment of radio channels determined by the assignment process.

I. METHODOLOGY OF INVENTION

A. General

The methodology for the invention herein is presented in a plurality of embodiments, each directed to a novel method for managing neighbor channel interference toward the achievement of an overall S/I ratio goal. As will be apparent from the specific discussion of those embodiments, each embodiment may be implemented independently, but most are also capable of being implemented in combination with one or more other embodiments, as well as with embodiments of the methodologies disclosed in the cross-referenced companion applications.

As a preface to the description of those particular embodiments, certain relationships are developed among channel separation (between a serving channel and an interfering neighbor channel), received signal strength for serving and for interfering channels and the S/I ratio. These relationships are then applied with respect to the subsequently described embodiments of the invention.

The level of interference contributed by neighbor channel transmitters depends on the position of the subscriber units (generally, mobile or portable) relative to their base station (s), the level of power control exercised, and the direction of communication—i.e., whether transmission occurs from the base station to the subscriber unit (referred to herein as "down link"), or from the subscriber unit to the base station (referred to herein as "up link"). FIGS. 5 and 6 illustrate exemplary configurations for consideration of the impact of neighbor-channel interference. FIG. 5 illustrates a single cell with base station B, while in FIG. 6, two neighboring cells are illustrated, with base stations $B_1$ and $B_2$. In both figures, subscriber stations i and j are shown juxtaposed in various configurations relative to one another and to the base station (s). In all configurations the designation i indicates the serving subscriber unit, and the designation j indicates the subscriber unit operating on the nearest channel in the frequency spectrum, referred to as the neighbor channel. In the configurations of FIG. 6, serving subscriber unit i is served by base station $B_1$ and neighbor-channel subscriber unit j is served by base station $B_2$.

Figure 5A:
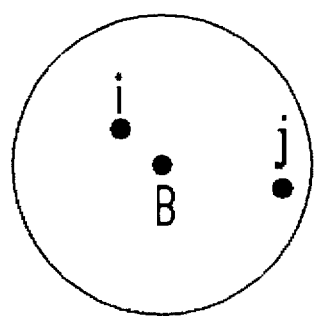
FIG. 5 illustrates schematically a single cell including its base station, with a served subscriber station and a potentially interfering subscriber station juxtaposed at various positions relative to each other and to the base station.
Figure 5B:
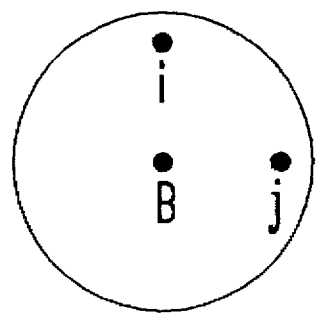
Figure 5C:
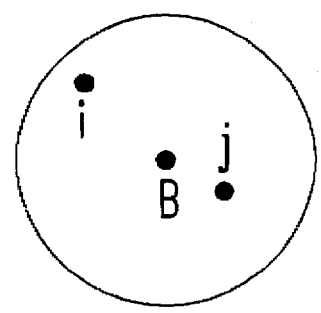

As an illustrative case, consider that all calls are served with equal power—i.e., no power control applied. Accordingly, down link neighbor-channel interference will be comparable in all the cases illustrated in FIG. 5 since all calls are served with the same power. The up link neighbor-channel interference, however, will be different in the three cases illustrated in FIG. 5. Because of signal attenuation as distance increases between transmitter and receiver, the signal strength received from subscriber unit i in FIG. 5(a) is stronger (due to its proximity to the serving base station) than the interfering signal from subscriber unit j. Hence up-link neighbor-channel interference for this configuration will be negligible. In the configuration of FIG. 5(b) the received serving signal is comparable to the interfering signal since the two subscriber units are the same distance from the base station. Finally, in the configuration of FIG.

5(c), up-link neighbor-channel interference is high because the interfering subscriber unit is closer to the base station than the serving subscriber unit.

If power control is used to reduce the power of calls closer to the base station, the experienced neighbor-channel interference changes. These changes can be illustrated by again considering the configurations of FIG. 5 and now assuming that power is adjusted so as to equalize the received serving signals. Then, up-link neighbor-channel interference would be comparable in all three configurations of FIG. 5 because the signal received from all subscriber units is the same, regardless of position of the unit relative to the base station. On the other hand, with down-link power control applied, neighbor-channel interference will be different for each of the three configurations. Power control causes down-link neighbor-channel interference to increase in FIG. 5(a) since the power of the interfering signal is higher than that of the serving signal. Power control does not alter down-link neighbor-channel interference in the configuration of FIG. 5(b), since both the served and neighbor-channel subscriber units are equidistant from the base station. However, in the configuration of FIG. 5(c), power control will causes down-link neighbor-channel interference to decrease. Thus, as can be seen, power control is generally beneficial in the up-link direction, but can often result in increased neighbor-channel interference when used in the down-link direction.

Figure 6A:
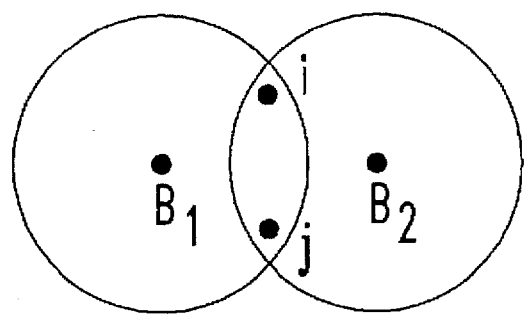
FIG. 6 illustrates schematically two neighboring cells, each with a base station, and with a served subscriber station and a potentially interfering subscriber station juxtaposed at various positions relative to each other and to the base stations.
Figure 6B:
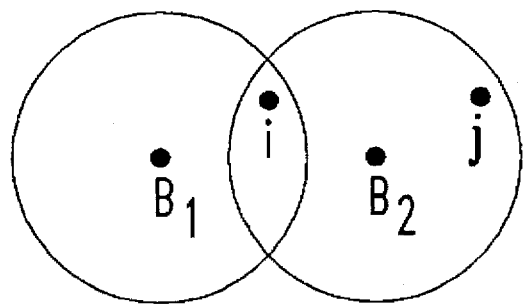
Figure 6C:
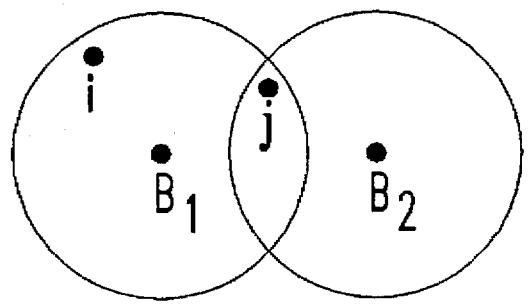

In the neighboring cells case shown in FIG. 6, and considering first the configuration of FIG. 6(a), subscriber unit i will experience neighbor-channel interference on both the down link (due to the competing signal from base station $B_2$) and the up link (due to the competing signal from subscriber station j). As will readily be seen from the figures, comparable neighbor-channel interference will be experienced on the down link in FIG. 6(b) and on the up link in FIG. 6(c), but the neighbor-channel interference will be negligible on the up link in FIG. 6(b) and on the down link in FIG. 6(c).

To state the above-described relationships algebraically, the following notation is used. Let:

S—serving signal strength at subscriber unit i

P—ratio of the strengths of the signals serving subscriber units j and i as received by subscriber unit i if the two signals were co-channel w—frequency spectrum separation between the channels serving subscriber units i and j, expressed as multiples of channel band width N—relative signal strength drop due to the channel separation w T—S/I ratio realized by subscriber unit i $T_c$—ratio of the serving signal strength to the co-channel interference at subscriber unit i Note that this analysis is initially directed to the downlink case. However, with minor notational changes described hereafter, relationships comparable to those developed here are also applicable in the uplink case.

From these notational definitions, it can be that the co-channel interference at subscriber unit i would be $S/T_c$, and the neighbor-channel interference received from subscriber unit j would be $(S P)/N$.[4]/. The S/I ratio experienced on the down link by subscriber unit i can thus be written as follows:

$$T = \frac{S}{\frac{S}{T_c} + 2\frac{SP}{N}} \quad (1)$$

The first term in the denominator is the co-channel interference; the second is the neighbor-channel interference.

[4]/In the worst case, at most two neighbor channels, one on each side of the operating channel, would contribute interference of this magnitude. The interference from neighbor channels at greater frequency spectrum separations is lower and, therefore, will be ignored.

The relationship between N and w can be written for given channel filter characteristics as follows:

$$w = (1/2) \, 2^{10 \, \log_{10}(N)/B} \quad (2)$$

where B is the relative signal strength falloff outside the voice band region, expressed in dB/oct [See: Lee, *Mobile Cellular Telecommunications Systems, id.*][5]/. Using the relationship of Equation (2) to eliminate N from Equation (1), gives the following relationship between T, w, and $T_c$:

$$T = \frac{1}{\frac{1}{T_c} + (2P) \, 10^{-B[1+\frac{\log_{10}(w)}{\log_{10}(2)}]/10}} \quad (3)$$

Equation (3) can be used to find the trade-off between the channel spacing w and the S/I ratio T, for a specified co-channel S/I ratio $T_c$ and given channel filter characteristics.

[5]/The conversion to dB is as follows: $dB(T) = 10 \, \log_{10}(T)$.

As an illustrative wireless communications application, which will be used herein to depict implementation of the embodiments of the invention, consider the use of an exemplary filter with B equal to 24 dB/oct, and a co-channel S/I threshold $T_c$ of 18 dB ($T_c=10^{1.8}=63.1$)—both values being typical of conventional cellular system design. The trade-off between T and w for this illustrative case, as derived by Equation (3) is given in Table 1, where the first column represents the channel spacing w, given in multiples of the channel bandwidth. The remaining ten columns give, for different P values, the value for T, both expressed in dB. As would be expected, increasing channel spacing increases the S/I ratio, which, at larger w values, converges to the design co-channel S/I ratio, $T_c$.

TABLE 1

Trade-off between channel spacing and S/I ratio dB(T)
$dB(T_c) = 18$

| Channel Spacing | dB(P) | | | | | | | | | |
|---|---|---|---|---|---|---|---|---|---|---|
| w | −20 | −15 | −10 | −5 | 0 | 4 | 14 | 20 | 28 | 40 |
| 1 | 17.98 | 17.93 | 17.79 | 17.36 | 16.23 | 14.46 | 6.66 | 0.90 | −7.02 | −19.01 |
| 2 | 18.00 | 18.00 | 18.00 | 18.00 | 17.99 | 17.98 | 17.79 | 17.21 | 14.46 | 4.78 |
| 3 | 18.00 | 18.00 | 18.00 | 18.00 | 18.00 | 18.00 | 17.99 | 17.97 | 17.79 | 15.47 |
| 4 | 18.00 | 18.00 | 18.00 | 18.00 | 18.00 | 18.00 | 18.00 | 18.00 | 17.98 | 17.67 |
| 5 | 18.00 | 18.00 | 18.00 | 18.00 | 18.00 | 18.00 | 18.00 | 18.00 | 18.00 | 17.94 |

Re-arrangement of equation (3) gives, for different channel spacing values w, the design co-channel S/I ratio, $T_c$, needed to achieve a target S/I ratio, T. Table 2 shows the trade-off between $T_c$ and w for dB(T) equal to 18 dB. Since $T_c$ affects capacity through its impact on re-use distance, and an increase in w reduces capacity, there is an optimal combination of $T_c$ and w that would maximize capacity.

interference becomes acceptable. That defined value is designated herein as $P_a$ and in the exemplary case described is equal to −10 dB.

Considering the trade-off between w and $T_c$ in Table 2, for the case of dB(P)=0, it can be seen that increasing the channel spacing from 1 to 2 would allow one to plan for a co-channel S/I ratio of 18.01 dB, instead of 21.03 dB.

TABLE 2

Trade-off between channel spacing and co-channel S/I ratio dB($T_c$)
dB(T) = 18

| Channel Spacing | dB(P) | | | | | | | | | |
|---|---|---|---|---|---|---|---|---|---|---|
| w | −20 | −15 | −10 | −5 | 0 | 4 | 14 | 20 | 28 | 40 |
| 1 | 18.02 | 18.07 | 18.22 | 18.75 | 21.03 | NA | NA | NA | NA | NA |
| 2 | 18.00 | 18.00 | 18.00 | 18.00 | 18.01 | 18.02 | 18.22 | 18.97 | NA | NA |
| 3 | 18.00 | 18.00 | 18.00 | 18.00 | 18.00 | 18.00 | 18.01 | 18.03 | 18.22 | 24.76 |
| 4 | 18.00 | 18.00 | 18.00 | 18.00 | 18.00 | 18.00 | 18.00 | 18.00 | 18.02 | 18.36 |
| 5 | 18.00 | 18.00 | 18.00 | 18.00 | 18.00 | 18.00 | 18.00 | 18.00 | 18.00 | 18.06 |

Equations (1) to (3) and the results of Tables 1 and 2 may be applied equally to up-link communications, with a minor redefinition of the following parameters:

S—signal strength received from subscriber unit i at the serving base station

P—ratio of the signal strengths received from subscriber units j and i at the base station serving i, if the two signals were co-channel T—S/I ratio at the base station serving subscriber i $T_c$—ratio of the serving signal strength to the co-channel interference at the base station serving subscriber unit i As noted earlier, in the case of no power control being applied and both subscriber units i and j being served by the same base station (i.e., the configuration of FIG. 5), the down-link interfering and serving signals will be comparable, because of the equal power with which each signal is transmitted from the base station. Thus, the ratio of the interfering signal to the serving signal, P, is equal to 1 and dB(P) is equal to 0. As will be seen from Table 1, if adjacent channel use were allowed, the S/I ratio would drop to 16.23 dB, which represents 67 percent of the target value of 63.1 (18 dB). Setting channel spacing w equal to 2 is sufficient to reclaim most of the S/I drop caused by neighbor-channel interference—an S/I ratio increase from 16.23 to 17.99 dB.

A comparable condition occurs when subscriber units i and j are served by different base stations if the serving subscriber unit i is near the common boundary between the two cells, regardless of the position of the interfering subscriber unit j, as illustrated in FIGS. 6(a) and 6(b). However, if subscriber unit i is further away from the interfering base station $B_2$ than from its serving base station $B_1$, as illustrated in FIG. 6(c), the P ratio will be less than 1, and dB(P) becomes negative. Thus the impact of adjacent channel use on the S/I ratio is less. For instance, at a dB(P) value of −5 dB, Table 1 shows that the realized S/I ratio will be 17.36 dB, which represents 86 percent of the design co-channel S/I ratio of 18 dB. For dB(P) equal to −10 dB, a 17.79 dB S/I ratio is realized, which represents 95 percent of the design co-channel S/I ratio. Alternatively, this can be characterized as the value realized by the S/I ratio if neighbor-channel interference is limited to 5 percent of the combined co-channel plus neighbor-channel interference. Accordingly, a value of P may be defined for which adjacent-channel Additionally, it will be seen that, if the spacing were increased above 2, one would gain little in terms of the co-channel interference bound and, hence, in terms of capacity.

For the power control case, it has been shown that power control on the down link exacerbates the impact of neighbor-channel interference. Consider the particular case of power control being applied on the down link to reduce the signal strength of subscriber units closer in. In this case, P would be equal to the difference in power reduction of the signals serving the two subscriber units. The worst case occurs when the power of the signal serving subscriber unit i is reduced substantially, and the serving subscriber unit j operates at maximum power, as is illustrated by the configuration of FIG. 5(a). Table 1 shows that, even though the design co-channel S/I ratio is 18 dB, the realized S/I ratio becomes negative when down-link power is reduced by 28 dB for the near-end subscriber unit. It takes a channel spacing of 3 to achieve a 17.79 dB S/I ratio.

In the companion cross referenced application designated M. Benveniste-9, a novel Mixed Power Control Methodology is disclosed which will permit the use of partial down-link power control without increasing channel spacing beyond the value of 2, while still maintaining a reasonable S/I ratio.

B. Channel Assignment Methodologies

In the sections following, three novel channel assignment methodologies are described which provide reduced neighbor channel interference relative to that achieved by prior art methods. These new channel assignment methodologies, each of which constitutes an embodiment of the invention, are designated as Even/Odd Cell Designation, Vertical Channel Set Construction, and Minimum Adjacency Circuit Method. Before discussing these new channel assignment methodologies in detail, however, a brief review of conventional channel assignment methodologies and principles is believed useful.

In traditional RF planning, adjacent channel restrictions within a cell have not been of much concern because of the way channel sets have been constructed. Typically, such channel sets have been comprised of the elements of the columns of a matrix formed by numbering consecutively the columns from left to right, one row at a time. This approach is characterized herein as the horizontal channel set construction method and is illustrated in FIG. 7. Consequently, a re-use factor N of 2, or greater, would automatically meet adjacent channel restrictions within a cell, since the difference in channel numbers between any two members of the same channel set is at least the re-use factor. Hence, adjacent channels never serve the same cell or the same sector of a cell.

For the case of neighboring cells, the direct way to prevent adjacent-channel interference between subscriber units in neighbor cells has been to avoid the assignment of adjacent channels to subscriber units that interfere with one another. The relative positions of such subscriber units determines whether that is so. As discussed above, subscriber units near the boundary of a cell can cause adjacent-channel interference on the up link communications of the cell on the other side of the boundary, depending on the received signal strength. The same subscriber unit would receive adjacent-channel interference on the down link from the neighbor cell. As a simplifying, but realistic assumption, a convention is adopted in the analyses herein that when P fails below the previously defined value, $P_a$, at which adjacent-channel interference becomes acceptable, there is no adjacent-channel interference. Otherwise, there is.

Additionally, adjacent-channel interference in regular channel assignment may be reduced through a reduction in the number of the neighbors of a cell that use adjacent channels. The boundary shared by two such neighbors is referred to as an adjacent edge. The use of adjacent edges as a surrogate for adjacent-channel interference is meaningful primarily in regular channel assignment, where all channel sets have equal size and, because of the way channel sets are constructed, two channel sets will either have all their channels adjacent or none.

B1. Odd/Even Cell Designation

A novel approach for meeting adjacent-channel restrictions within a cell is to assign a parity—odd or even—to each cell. A cell would be allowed to use only channels with numbers of the assigned parity. In fixed channel assignment, channel sets would contain either odd or even channel numbers, and cells would be assigned either odd or even channel sets. Both regular and non-regular channel assignment can benefit from this approach. Even though adjacent channel restrictions will always be met within a cell in regular channel assignment, due to the horizontal channel set construction, use of this odd-even approach may be desirable because it makes compliance with adjacent channel restrictions by neighbor cells easier, a characteristic that will be discussed in more detail hereafter.

B2. Vertical Channel Set Construction

Figure 1:
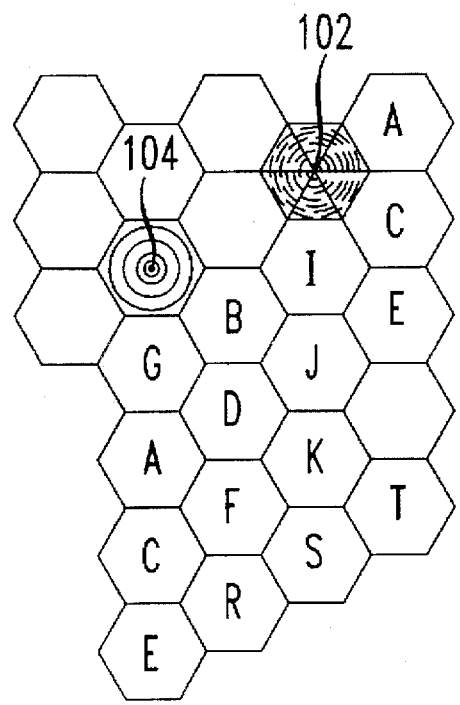
FIG. 1 depicts a schematic diagram of a regular cell layout for a wireless cellular communications system.
Figure 2:
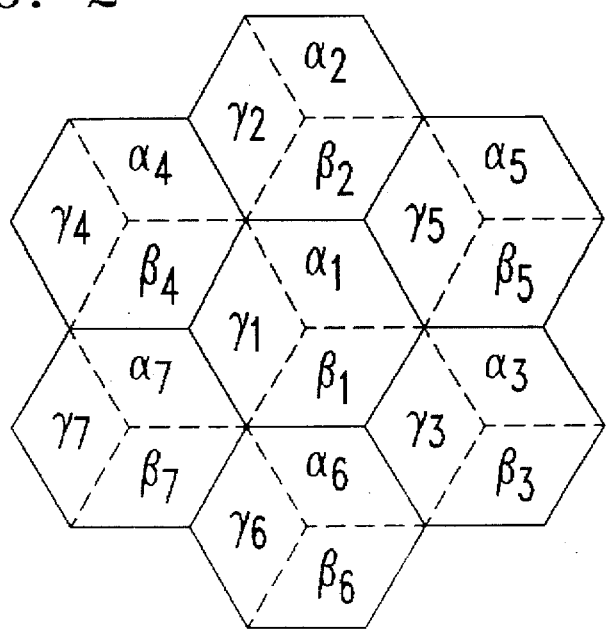
FIG. 2 depicts a sectorized cell arrangement based on a re-use factor of 7.

Adjacent channels should ordinarily not be used in contiguous sectors of sectorized cells (i.e., cells with directional antennas each covering a sector of the cell). To illustrate the point, in the cell of three sectors shown in FIG. 2, sector $\alpha_1$ should not use channels adjacent to those used in the other two sector $\beta_1$ and $\gamma_1$ in cell 1, or the two sectors $\beta_2$ and $\gamma_5$ next to it. As long as the antennas of the same label are aligned, it is sufficient to ensure that an $\alpha$ sector is not assigned channels adjacent to the channels of a $\beta$ or a $\gamma$ sector, and so on.

In conventional fixed regular channel assignment, sectors are generally assigned channel sets obtained by the horizontal method. That is, the channel sets are the columns of a matrix, where the total number of columns is equal to the re-use factor times the number of sectors per cell. Thus with a re-use factor of 7 used with three sectors, the channel set matrix would have 21 columns, as illustrated in FIG. 7. The first 7 columns would be assigned to the $\alpha$ sectors, the next 7 columns to the $\beta$ sectors and the last 7 columns to the $\gamma$ sectors. As can be seen in the figure, sectors of different orientations do not use adjacent channels, except for three pairs: $(\alpha_1, \gamma_7)$, $(\alpha_7, \beta_1)$, and $(\beta_7, \gamma_1)$.

A new channel set construction approach useful for sectorized cells is provided herein and designated as Vertical Channel Set Construction. In the case of regular channel assignment, the channel set matrix is constructed with a number of columns equal to the re-use factor, e.g., 7. Each column is then divided into portions, one for each sector in a cell. For instance, if there are three sectors, the top third of each column would be assigned to the $\alpha$ sectors, the middle to the $\beta$ sectors, and the bottom third to the $\gamma$ sectors, as illustrated in FIG. 8. Adjacent-channel interference can arise only between the last channel in $\alpha_7$ and the first channel $\beta_1$, and between the last channel in $\beta_7$ and the first channel in $\gamma_1$. Except for these two pairs of channels, no $\alpha$ sector has channels adjacent to any of the $\beta$ or $\gamma$ sectors, and so on. Adjacent channel restrictions are thus met, for all practical purposes.

Since only two channel pairs are adjacent, adjacent-channel interference could be totally eliminated either by dropping two channels (one from each pair), or by avoiding contiguity in these two pairs of sectors. Thus, all the acceptable conventional channel assignment plans discussed above (and, additionally, plans with sectors $\alpha_1$ and $\gamma_7$ next to each other) will be acceptable with this channel set construction approach.

Figure 9A:
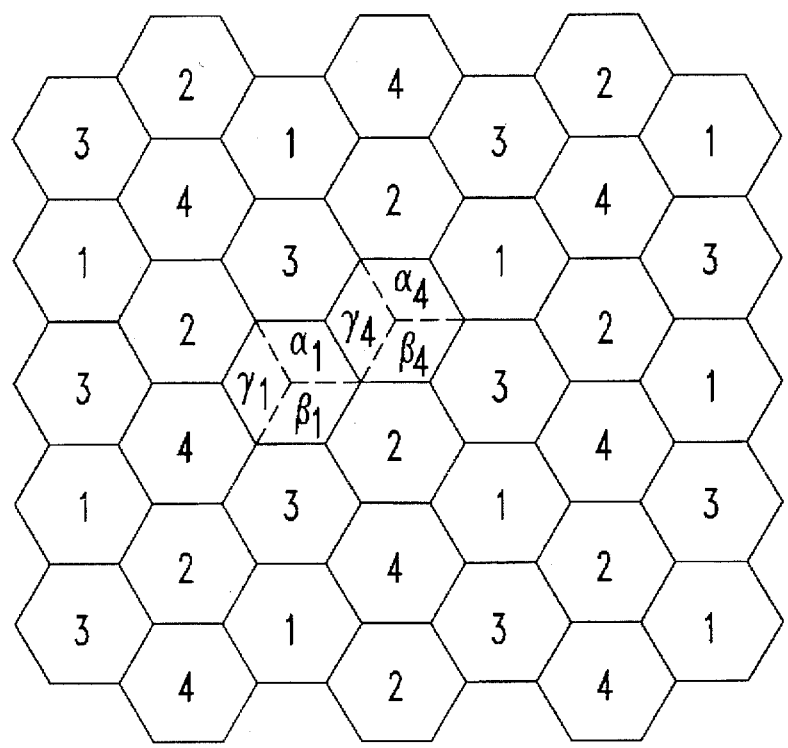
FIG. 9 shows sectorized cell arrangements with a re-use factor of 4.
Figure 9B:
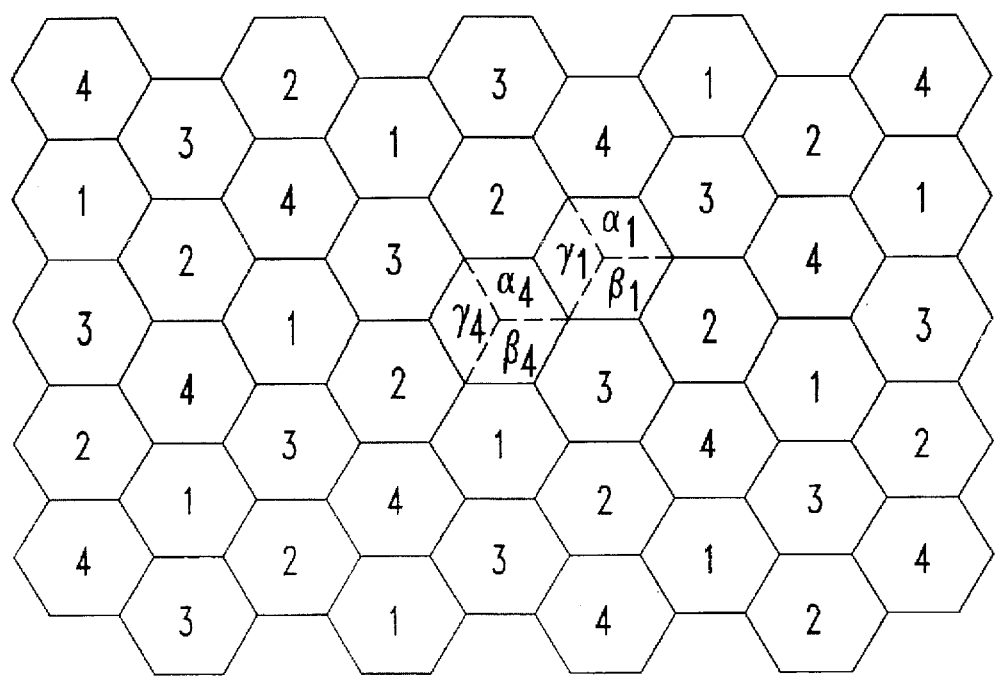

An application of this approach in regular channel assignment can be illustrated for the case of an S/I requirement in the range attainable with a re-use factor N=4 and three sectors per cell. Two such re-use patterns, I and II, are illustrated in FIG. 9. From an analysis of the geometric configuration for the worst case subscriber unit positioning, it can be determined that Pattern I will provide a higher worst-case S/I ratio (20.6 dB) than Pattern II (16.1 dB), and therefore, it is preferable.[6]/However, with conventional channel set construction methodologies for sectorized cells, there exists no antenna orientation and channel assignment that will lead to no adjacent edges for Pattern I. Vertical channel set construction, on the other hand, will provide a feasible assignment.

[6]/The S/I ratio is computed by summing the interference contributions of the six closest co-channel cells to a fixed point on the boundary of the cell's coverage area.

Vertical channel set construction applies also to fixed non-regular channel assignment, where cells may be of different size and may require different channel capacity. In this case, the frequency spectrum would be partitioned into a number of disjoint segments equal to the number of sectors per cell. Each sector would then be assigned the optimal number of channels from the segment corresponding to its label. For instance, if there are three sectors per cell, the $\alpha$ sectors can be assigned channels with the lowest numbers. The $\beta$ sectors would take the channels that follow, and the $\gamma$ sectors would get the channels with the highest numbers.

Finally, the vertical channel set approach will also be useful with dynamic channel assignment. Once the available spectrum is partitioned into segments, sectors with the same antenna direction use channels from the same spectrum segment. As long as the flexible channel assignment algorithm makes certain that adjacent channel restrictions are respected within the cell, adjacent-channel interference is eliminated.

B3. Minimum Adjacency Circuit Method

Figure 10:
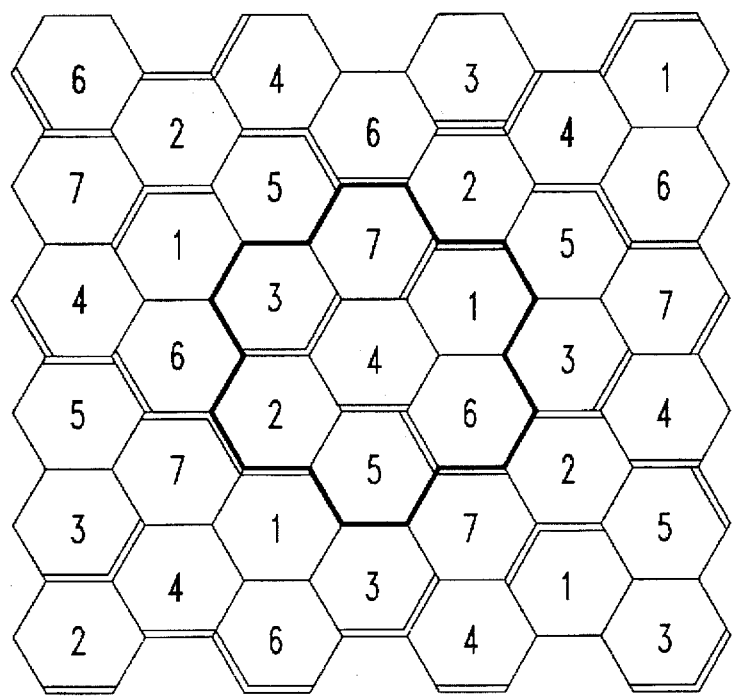
FIG. 10 shows an omni-directional cell arrangement with a re-use factor of 7 which depicts the cells assigned adjacent channel sets.
Figure 10:
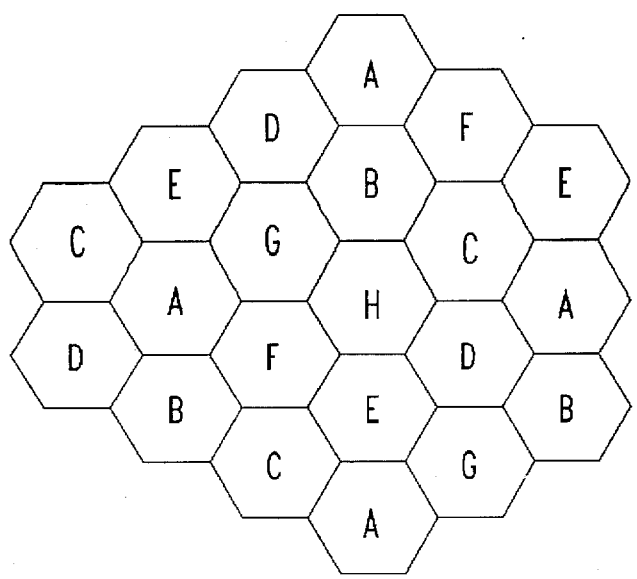

Omni-directional cells (cells using a single full-aperture antenna) when arranged according to the classical pattern of re-use factor 7, will violate adjacent channel restrictions with two neighbor cells each, as illustrated in FIG. 10—e.g., cell #3 having adjacent edges with cells #2 and #4. The probability that P will exceed the previously defined threshold value, $P_a$—and thus that adjacent-channel interference will be noticeable—on the down link is 0.23 in the worst case. The probability for up-link adjacent-channel interference is 0.21. The probability that a call will experience adjacent-channel interference on the down link, or on the up link, or on both is 0.39 for the worst case. (All probabilities determined by simulation.)

It has generally been believed that the smallest re-use factor that would enable compliance with adjacent channel restrictions—i.e. avoidance of adjacent edges—is 12[2]/or, more recently, 9[8]/, when channel sets are constructed by the traditional horizontal method. A method is provided herein for meeting adjacent channel restrictions between neighbor cells with an N of 8, using an odd/even channel set construction. This method also provides a higher capacity, 40 erlangs per cell, than the traditional methods for meeting those restrictions, and achieves an S/I ratio of 19.5 dB. A comparison of the traffic capacity, at a 2 percent blocking probability, for the method of the invention (N of 8) versus reuse factors of 7, 9, and 12 is presented in Table 3.

TABLE 3

Capacity of omni-directional cells for different re-use factors

| Re-Use Factor | Erlangs/cell |
| --- | --- |
| 7 | 47 |
| 8 | 40 |
| 9 | 35 |
| 12 | 24 |

[2]/See, A. Gamst, "Homogeneous Distribution of Frequencies in a Regular Hexagonal Cell System", *IEEE Trans. Veh. Technol.*, Vol. 31, No. 3, August 1982
[8]/See, S. Faruque, "The N=9 Frequency Plan: A Modified Technique to Enhance C/I Performance and Capacity", ICUPC '93 *Conference Record*, August 1993; or M. Benveniste, "Managing Neighbor Channel Interference in Channelized Cellular Systems," forthcoming.

Figure 11B:
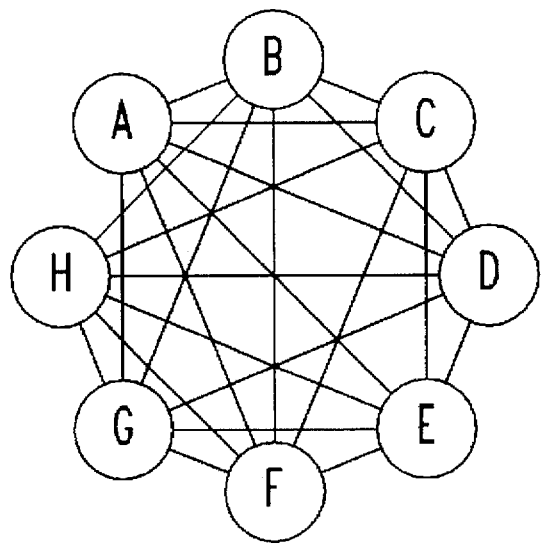
FIG. 11 depicts a cell layout, a neighbor graph and its complement for an omni-directional cell arrangement with a re-use factor of 8.
Figure 11C:
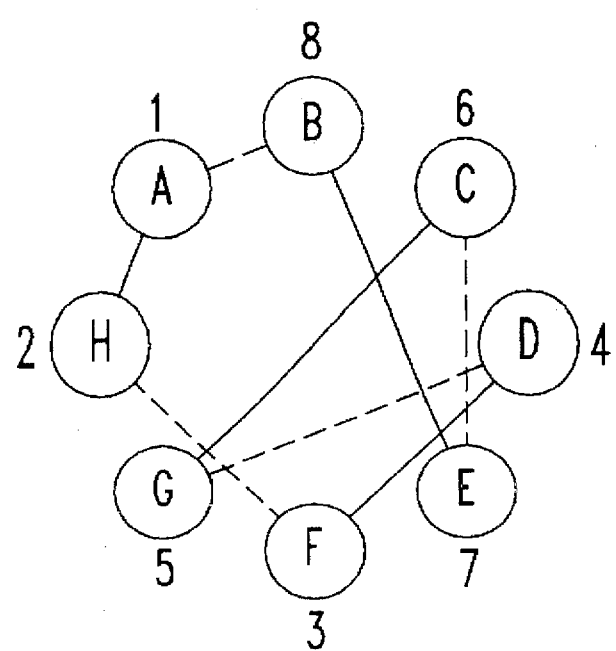

The approach for finding a channel assignment with a minimum number of adjacent edges for the N of 8 reuse pattern begins with consideration of the omni-directional re-use patterns shown in FIG. 11-A, depicting a re-use factor of 8. As will be seen, channel sets are assigned to each cell labeled A, B, C, . . . , so that the largest number of adjacent edges per cell is minimum.

With the odd/even construction the number of adjacent channel sets is one. Every odd channel set is adjacent to the even set above it, and every even channel set is adjacent to the odd set below it. An even channel set will contain only one channel adjacent to a channel in the odd channel set above it. One of the two channels in the adjacent channel pair could be removed, thus eliminating any possibility of adjacency in the two channel sets. If this is done, some of the odd channel sets will contain even channel numbers, and some of the even channel sets will contain odd channel numbers.

The optimal channel assignment is found by constructing the complement of the neighborhood graph. A neighborhood graph has nodes that correspond to the cells in a re-use cluster, and edges for each pair of nodes if they correspond to abutting cells. FIG. 11-B shows the neighborhood graph for the re-use pattern of FIG. 11-A. The complement of a graph has the same node set as the initial graph. An edge exists in the complement graph if there is none in the initial graph, as seen in FIG. 11-C.

To assign channel sets to cells, the nodes in the complement graph are numbered from 1 to N. If the nodes can be numbered so that there exists an edge in the graph between every pair of adjacent channel sets, neighbor cells will share no adjacent edges. Otherwise, edges are added for each adjacent pair of channel sets. The objective is to minimize the number of edges added per node.

For the N equal to 8 re-use pattern, one edge must be added per node if horizontal channel set construction is used. Hence, each cell will have one adjacent edge. For the numbering selected in FIG. 11-C, the adjacent edges lie between the following pairs of tens: (A, B), (C, E), (D, G), and (F, H).

With an odd/even construction, on the other hand, a channel assignment can be found with no adjacent edges for the N of 8 re-use pattern above. The node numbering shown in FIG. 11-C gives such an assignment. Naturally, only even re-use factors can employ the odd/even construction approach.

II. CONCLUSION

Herein has been disclosed a plurality of novel methodologies for managing neighbor-channel interference. These methods, and combinations thereof, can be employed with fixed and flexible, regular and non-regular channel assignment. And, they are applicable to all channelized systems whether they employ frequency-division multiple access or hybrid frequency-division/time-division multiple access.

As shown in the discussion, the methods disclosed herein can be easily combined, as well as being combinable with embodiments of the inventions claimed in the cross-referenced companion applications. An example that illustrates the potential for synergy among the several disclosed channel management methodologies even better is that of a cellular system on an irregular grid, with a non-uniform traffic distribution, comprised of a mix of sectorized and omni-directional cells. An objective is to find an optimal non-regular channel assignment that respects adjacent channel restrictions. Odd/even Cell Designation can be used to ensure compliance with adjacent channel restrictions within a cell. Mixed Power Control with Directed Assignment (from companion application M.Benveniste-9) will reduce adjacent channel interference between neighbor cells. And, Vertical Channel-Set Construction will ensure that sectors of the same cell do not use adjacent channels. Finally, any channel borrowing scheme that uses channels according to a cell's odd/even designation and a sector's orientation can make this channel assignment dynamic, without violating adjacent channel restrictions.

Although the present embodiment of the invention has been described in detail, it should be understood that various changes, alterations and substitutions can be made therein without departing from the spirit and scope of the invention as defined by the appended claims.

I claim:

1. In a wireless communication network having service areas partitioned into a plurality of cells, wherein a second plurality of communication channels are available for allocation among cells and at least a portion of said channels are successively disposed along a frequency continuum, a method for avoiding use of any two of said channels having adjacent frequencies within a common cell, and reducing co-channel and neighbor channel interference, comprising the steps of:

arranging channels into disjoint categories by the steps of assigning odd/even parity to each cell and assigning to cells channels with numbers of the assigned parity;

arranging channels into a number of vertical columns equal to a reuse factor with a plurality of vertical groupings across all columns for identifying channels for sectors of cells.

determining adjacent edges between adjacent cells in a system which define the existence of adjacent channels in adjacent cells and from vertical listings of available channels.

2. In a wireless communication network having service areas partitioned into a plurality of cells, wherein a second plurality of communication channels are available for allocation among cells and at least a portion of said channels are successively disposed along a frequency continuum, a method for avoiding use of any two of said channels having adjacent frequencies within a common cell, and reducing co-channel and neighbor channel interference, comprising the steps of:

arranging channels into disjoint categories by the steps of assigning odd/even parity to each cell and assigning to cells channels with numbers of the assigned parity;

determining adjacent edges between adjacent cells in a system which define the existence of adjacent channels in adjacent cells and constructing a neighbor graph with nodes corresponding to cells in a reuse cluster; and assigning channels in a way so as to minimize adjacent edges;

constructing channel sets for individual cell by selecting channels from one disjoint set, and by determining adjacent edges to identify adjacent channel interference and reduce adjacent edges in channel selection.

3. A method of managing co-channel, neighbor channel and adjacent channel interference in a wireless communications network having service areas partitioned into a plurality of cells, wherein a second plurality of communication channels derived from a defined frequency spectrum are available for allocation among cells, said method comprising the steps of:

causing a transmission pattern in said cells in at least one of said service areas to be directed among a plurality of sectors;

partitioning said plurality of communications channels into a plurality of disjoint segments, said plurality of segments being numerically equal to said plurality of sectors, wherein each said partition of said communications channels in each said disjoint segment is comprised of essentially contiguous channels;

constructing a table of channels in a vertical set construction having listings of the numbers in sequence with cyclic repeats from column to column; the table comprising a predefined channel set wherein a number of columns in said table correspond to individual cells from a predetermined grouping of said cells to be served by channels in said channel set and further wherein said channels shown in each of said columns of said table are assigned to said corresponding cell;

dividing each of said columns into portions related to said segments in said plurality of disjoint segments.

4. A method for managing neighbor channel interference in a wireless communication system in which channel reuse is defined by assignment of channels to a pattern of a plurality of cells defining service areas, comprising the steps of:

designating alternate individual cells with even/odd numbers combined with providing disjoint frequency lists so that adjacent channel conflicts do not arise in neighboring cells;

organizing channel sets between abutting sectors in sectorized cells into a tabulated vertical channel-set construction; and minimizing numbers of adjacent edges between abutting cells or sectors.

\* \* \* \* \*